(12) United States Patent
Alfarhan et al.

(10) Patent No.: US 12,308,966 B2
(45) Date of Patent: May 20, 2025

(54) RELIABLE HARQ-ACK TRANSMISSION IN UNLICENSED SPECTRUM

(71) Applicant: InterDigital Patent Holdings, Inc., Wilmington, DE (US)

(72) Inventors: Faris Alfarhan, Montreal (CA); Patrick Tooher, Montreal (CA); Aata El Hamss, Laval (CA); Paul Marinier, Brossard (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 272 days.

(21) Appl. No.: 17/798,385

(22) PCT Filed: Feb. 11, 2021

(86) PCT No.: PCT/US2021/017666
§ 371 (c)(1),
(2) Date: Aug. 9, 2022

(87) PCT Pub. No.: WO2021/163330
PCT Pub. Date: Aug. 19, 2021

(65) Prior Publication Data
US 2023/0074723 A1 Mar. 9, 2023

Related U.S. Application Data

(60) Provisional application No. 63/060,960, filed on Aug. 4, 2020, provisional application No. 62/975,535, filed on Feb. 12, 2020.

(51) Int. Cl.
*H04L 1/16* (2023.01)
*H04L 1/1607* (2023.01)
(52) U.S. Cl.
CPC .................................. *H04L 1/1614* (2013.01)

(58) Field of Classification Search
CPC ... H04L 1/1614; H04L 1/1822; H04L 1/1896; H04L 1/1685; H04L 1/1858; H04L 1/1812; H04L 1/1854; H04W 72/23; H04W 72/04
See application file for complete search history.

(56) References Cited

U.S. PATENT DOCUMENTS

| | | | |
|---|---|---|---|
| 2014/0192738 A1* | 7/2014 | Nam | H04L 5/0053 370/329 |
| 2019/0229876 A1* | 7/2019 | Sugaya | H04W 84/12 |

(Continued)

FOREIGN PATENT DOCUMENTS

| | | |
|---|---|---|
| CN | 109586856 A | 4/2019 |
| EP | 3484079 A1 | 5/2019 |
| EP | 3493606 A1 | 6/2019 |

OTHER PUBLICATIONS

Third Generation Partnership Project (3GPP), "HARQ and scheduling enhancements for NR-U", Ericcson, R1-1912711, 3GPP TSG-RAN WG1 Meeting #99, Nov. 18-22, 2019, Reno, USA, 15 pages.

(Continued)

*Primary Examiner* — Walli Z Butt
(74) *Attorney, Agent, or Firm* — Flaster Greenberg, P.C.

(57) ABSTRACT

Methods and apparatuses are described herein for selective one-shot hybrid automatic repeat request (HARQ) feedback by priority level. For example, a wireless transmit/receive unit (WTRU) may determine a priority associated with each transport block (TB). The each TB may correspond to respective HARQ processes associated with downlink transmissions from a base station (BS). The WTRU may receive, from the BS, a request for the one-shot HARQ feedback with an indication of a priority selected for the one-shot HARQ feedback. The WTRU may generate a HARQ codebook for transmission of the one-shot feedback. The HARQ codebook may comprise one or more information bits cor- (Continued)

responding to one or more TBs determined based on the indicated priority. The WTRU may determine, based on a number of the one or more information bits, a transmission power and transmit, at the transmission power, the one-shot feedback comprising the generated HARQ codebook.

17 Claims, 8 Drawing Sheets

(56) References Cited

U.S. PATENT DOCUMENTS

| | | | |
|---|---|---|---|
| 2019/0253197 A1* | 8/2019 | Babaei | H04L 1/188 |
| 2020/0044791 A1* | 2/2020 | Tsai | H04L 1/1854 |
| 2020/0344012 A1* | 10/2020 | Karaki | H04L 1/1861 |
| 2021/0385831 A1* | 12/2021 | Nogami | H04L 5/0094 |

OTHER PUBLICATIONS

Third Generation Partnership Project (3GPP), "Enhanced Dynamic HARQ Codebook for NR-U", InterDigital, Inc. 3GPP TSG RAN WG1 #99, R1-1912698, Nov. 18-22, 2019, 5 pages.

* cited by examiner

Example for Codebook Composed of Feedback for 3rd, 4th and 10th HARQ Processes

| 0 | 0011 | HARQ-ACK Bitstring for 3rd HARQ Process | 1 | HARQ-ACK Bitstring for 4th HARQ Process | 0 | 0110 | HARQ-ACK Bitstring for 10th HARQ Process | 0 | 0000 |
|---|---|---|---|---|---|---|---|---|---|
| 455 | 460 | 465 | 470 | 475 | 480 | 485 | 490 | 495 | 497 |

450

FIG. 4B ic application is the 371 National Stage of International
RELIABLE HARQ-ACK TRANSMISSION IN UNLICENSED SPECTRUM

CROSS REFERENCE TO RELATED APPLICATION

This application is the 371 National Stage of International Application No. PCT/US2021/017666, filed Feb. 11, 2021, which claims the benefit of U.S. Provisional Application No. 62/975,535, filed on Feb. 12, 2020, and U.S. Provisional Application No. 63/060,960, filed on Aug. 4, 2020, the contents of which are hereby incorporated by reference herein.

BACKGROUND

A wireless transmit/receive unit (WTRU) supporting ultra-reliable low-latency communication (URLLC) service may operate in 5G NR in unlicensed spectrum (NR-U). Such a WTRU may benefit from using all hybrid automatic repeat request (HARQ) mechanisms (e.g., Type 2 codebook or Type 3 codebook) introduced for URLLC and NR-U operation. However, with such HARQ mechanisms, ensuring reliable transmission of high-priority HARQ-acknowledgement (ACK) can require high transmission powers when the HARQ-ACK payload is more than a few bits. Furthermore, reporting HARQ-ACK information for all HARQ processes will result in interference, power scaling, and/or loss of reliability of the URLLC HARQ-ACK codebook. Thus, methods and apparatuses for reliable HARQ-ACK transmission are needed.

SUMMARY

Methods and apparatuses are described herein for selective one-shot hybrid automatic repeat request (HARQ) feedback by a priority level. For example, a wireless transmit/receive unit (WTRU) may determine a priority associated with each transmport block (TB). The each TB may correspond to respective HARQ processes associated with downlink transmissions from a base station (BS). The priority associated with the each TB may be determined based on a priority of respective, previous physical downlink shared channel (PDSCH) transmission, a downlink transmission type (e.g., dynamic or semi-persistent scheduling) or a dynamic indication (e.g., downlink control information (DCI) or medium access control (MAC) control element (MAC CE)) received from the BS. The WTRU may receive, from the BS, a request for the one-shot HARQ feedback with an indication of a priority selected for the one-shot HARQ feedback. The WTRU may generate a HARQ codebook for transmission of the one-shot HARQ feedback. The HARQ codebook may comprise one or more information bits (e.g., acknowledgement (ACK) bit and/or negative acknowledgement (NACK) bit) corresponding to one or more TBs determined based on the indicated priority. The WTRU may determine, based on a number of the one or more information bits, a transmission power and then transmit, at the transmission power, the one-shot HARQ feedback that comprises the generated HARQ codebook.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 4B is a diagram illustrating example compression of HARQ feedback with indexing.

DETAILED DESCRIPTION

Figure 1A:
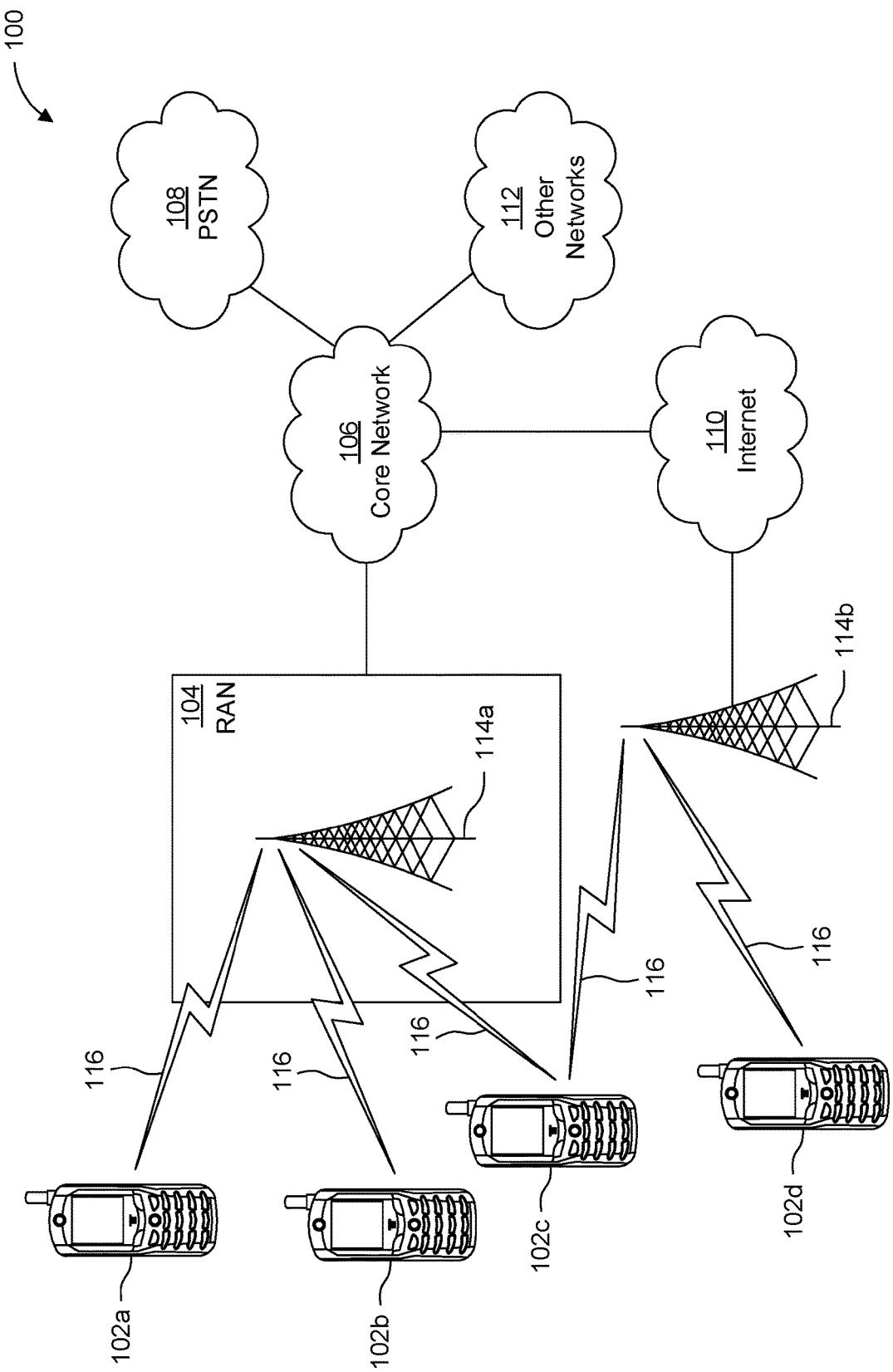
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
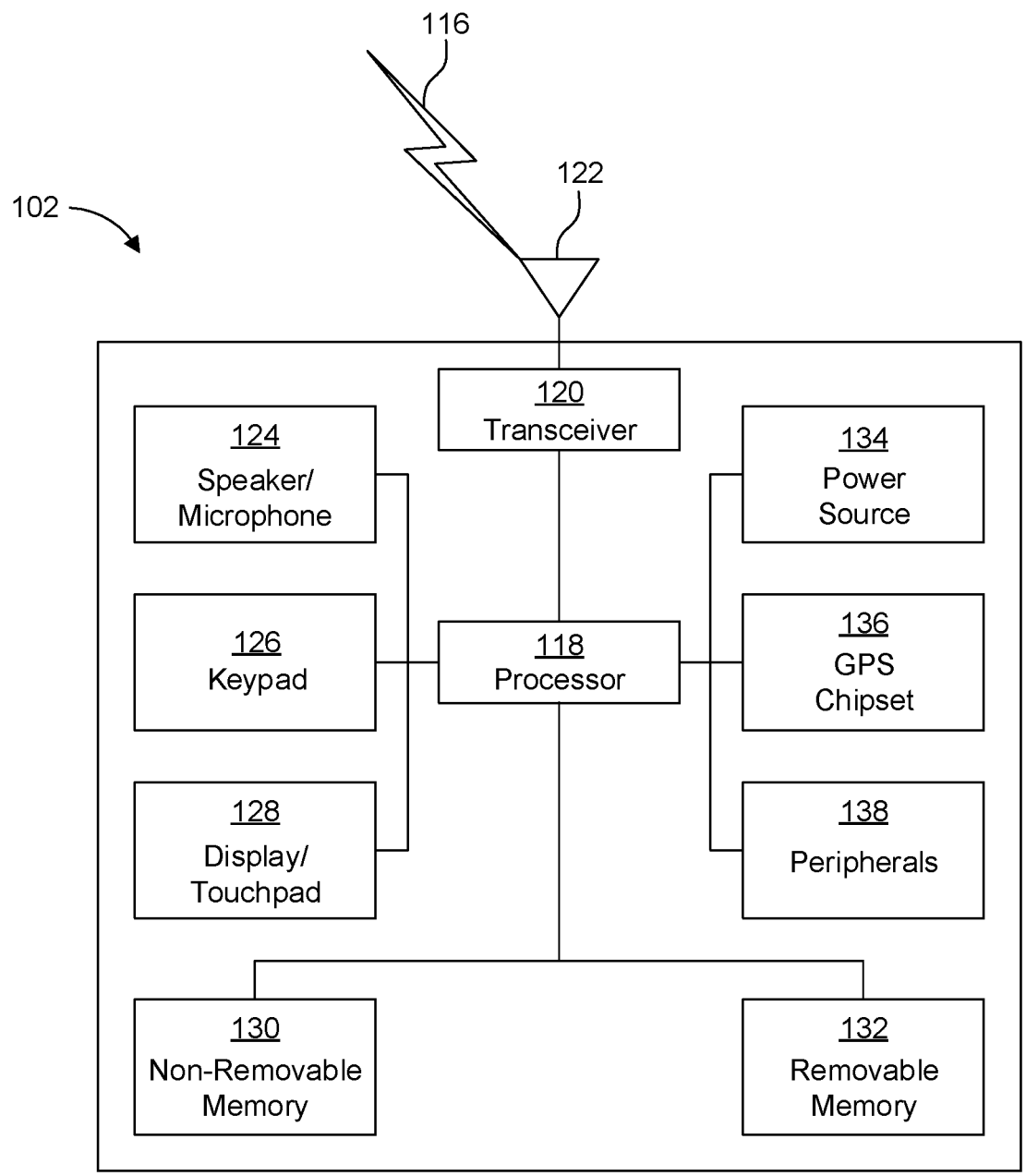
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
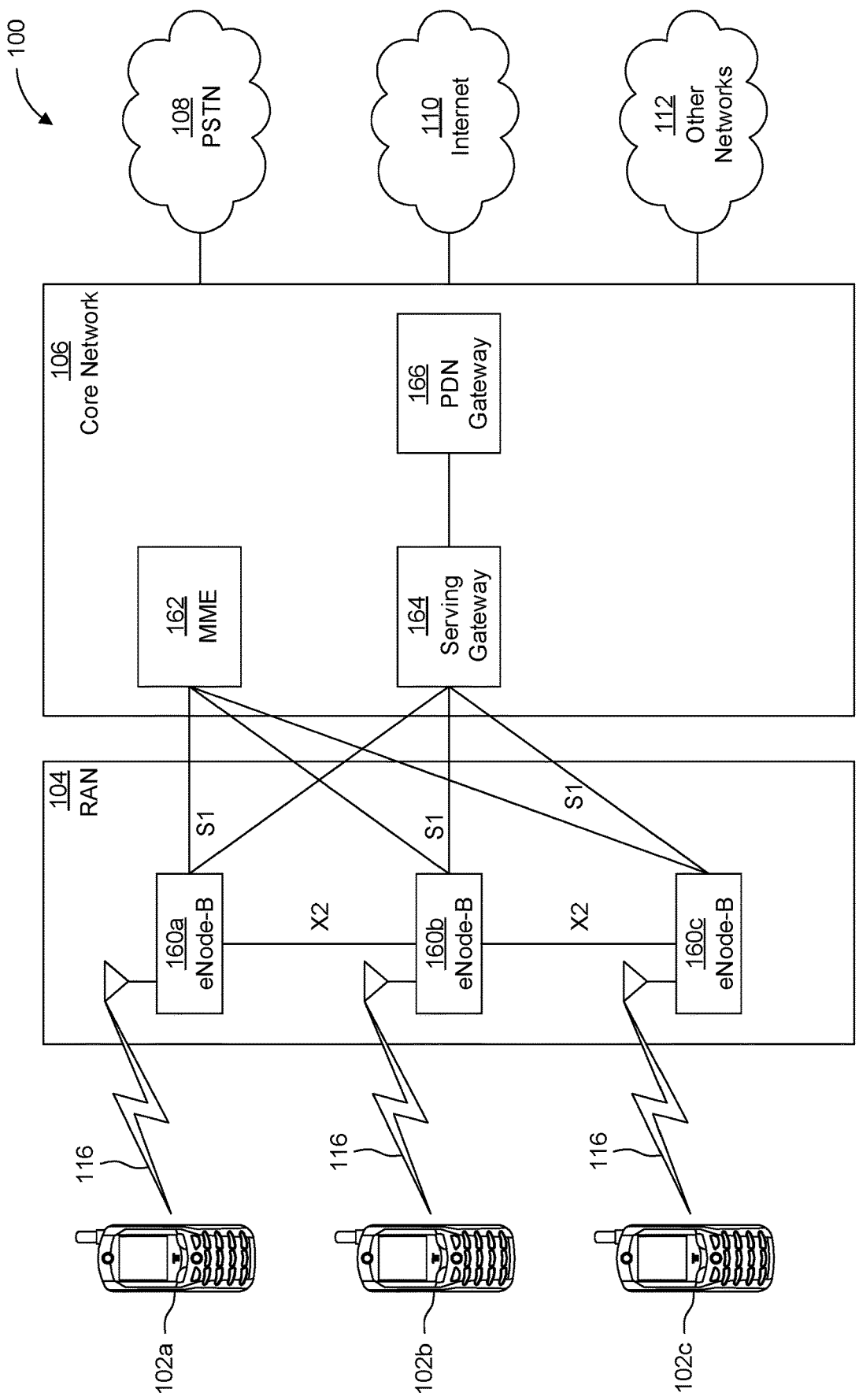
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
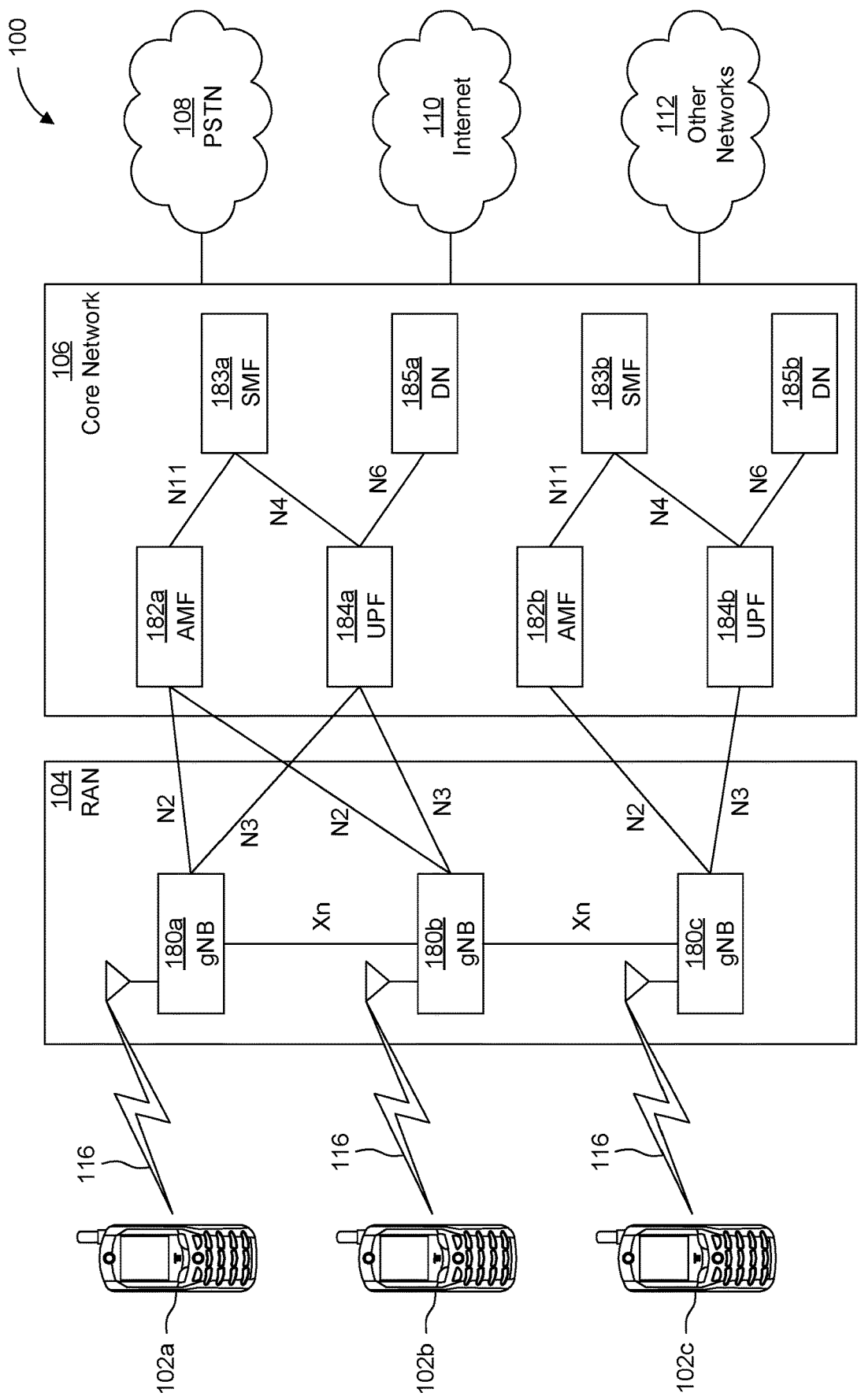
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

To better support operation with different types of service such as URLLC and eMBB, there may be mechanisms to ensure that certain transmissions can be received with a higher level of latency and reliability. For example, a HARQ-ACK may be transmitted according to one of two possible physical uplink control channel (PUCCH) configurations depending on a priority level assigned to the HARQ-ACK. This may enable transmission of high-priority HARQ-ACK at a higher power level than low-priority HARQ-ACK, for example.

Separately, there may be mechanisms that better enable transmission of HARQ-ACK when operating in NR unlicensed spectrum (NR-U). A first mechanism, referred to as "enhanced Type 2 codebook", may enable the scheduler to request transmission of HARQ-ACK information for certain physical downlink shared channel (PDSCH) transmissions identified by a PDSCH group. A second mechanism, referred to as "Type 3 codebook" or "one-shot feedback", may enable the scheduler to request HARQ-ACK information for all HARQ processes and serving cells.

In some scenarios, a WTRU supporting ultra-reliable low latency communication (URLLC) service may be operating in an unlicensed spectrum (e.g., NR-U). Such a WTRU may benefit from using all HARQ-ACK enhancements introduced for URLLC and NR-U operation. However, ensuring reliable transmission of high-priority HARQ-ACK may require an excessively high transmission power level if the HARQ-ACK payload is more than a few bits. For example, when the WTRU reports HARQ-ACK information using a Type 3 codebook (e.g., one-shot feedback), the WTUR transmits HARQ-ACK information for all HARQ processes and cells. This may result in excessive interference and/or power scaling, in which case the Type 3 codebook reporting may be effectively unusable. In some cases, the enhanced Type 2 codebook mechanism may not take into consideration the priority of the HARQ-ACK. This may result, for example, in the WTRU grouping HARQ-ACK of high priority in a resource unsuitable for that purpose.

Figure 2:
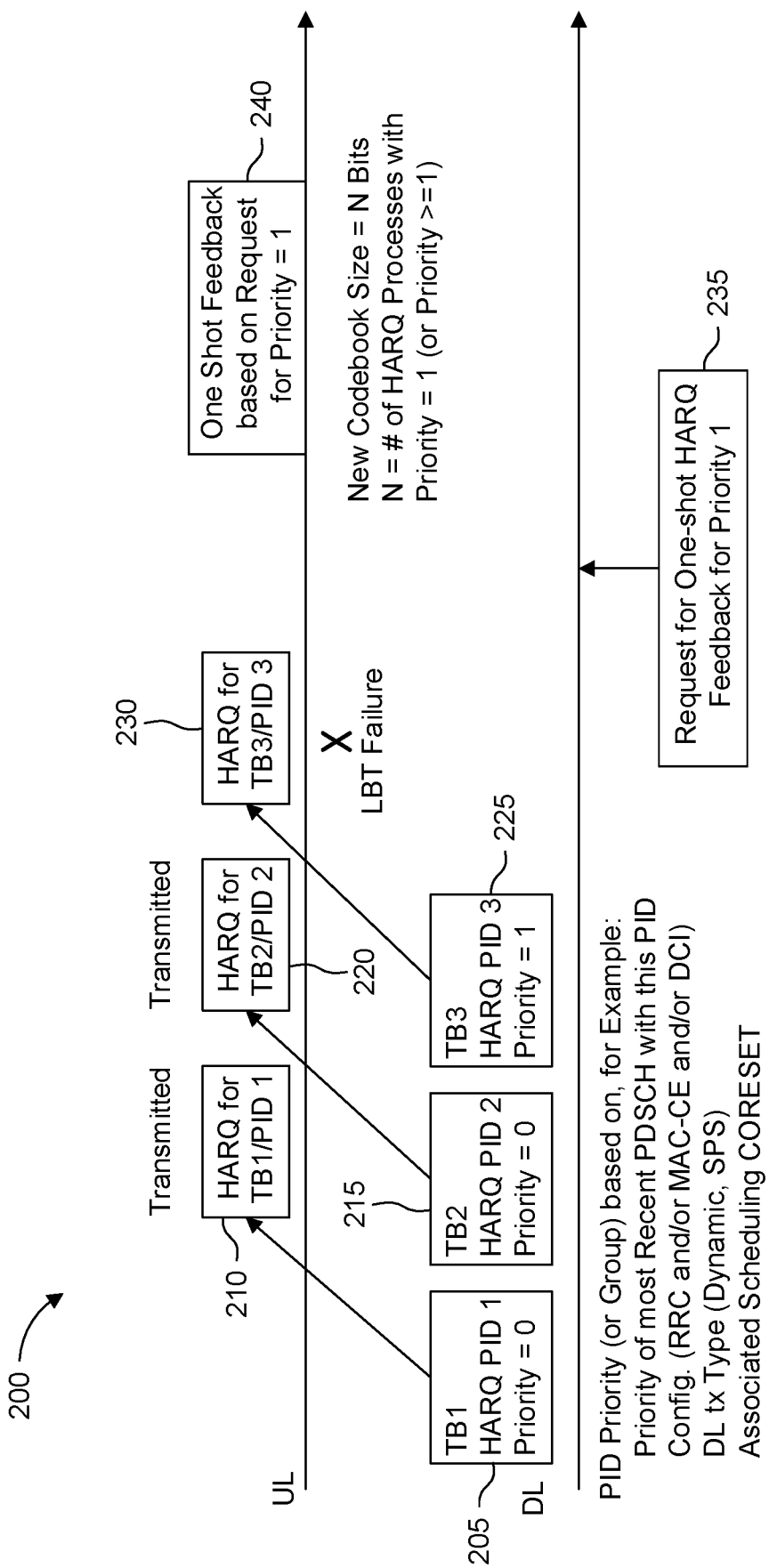
FIG. 2 is a diagram illustrating an example selective one-shot hybrid automatic repeat request (HARQ) feedback procedure with a HARQ codebook based on a priority level.

FIG. 2 illustrates an example selective one-shot HARQ feedback procedure 200 with a HARQ codebook based on a priority level, which may be used in combination with any of other embodiments described herein. As illustrated in FIG. 2, a BS may transmit multiple (e.g., 16) TBs 205, 215, 225 to a WTRU associated with the BS. Each of the TBs (e.g., TB1 205, TB2 215, and TB3 225) may be associated with a HARQ process for HARQ feedback. Each HARQ processes may be associated with each HARQ process ID (PID) (e.g., HARQ PID1, HARQ PID2, and HARQ PID3). Each HARQ process or HARQ PID may be associated with a respective priority. As illustrated in FIG. 2, the BS may indicate the WTRU that TB1/HARQ PID1 205 and TB2/HARQ PID2 215 are associated with priority 0 (i.e. low priority), for example, using downlink control information (DCI). The BS may also indicate the WTRU that TB3/HARQ PID3 225 is associated with priority 1 (i.e. high priority), for example, using DCI. Upon receiving the multiple TBs (e.g., TBs1-3 205, 215, 225) from the BS, the WTRU may transmit HARQ feedback 210, 220 associated with the respective HARQ PIDs (i.e. HARQ PID1 and HARQ PID2). In one example, the WTRU may determine a priority associated with a HARQ process based on RRC configuration or dynamic downlink indications such as DCI and MAC-CE. In cases that the WTRU missed the RRC configuration or the dynamic downlink indications, the WTRU may determine the priority associated with the HARQ process using different methods. The examples of the different methods may include, but are not limited to, using the priority of most recent PDSCH transmission with the same received HARQ PID, downlink (DL) transmission type such as dynamic assignment or semi-persistent scheduling, and/or associated scheduling control resource set (CORESET) or search space.

The WTRU may fail to transmit the HARQ feedback 230 for the TB3/PID3 due to listen before talk (LBT) failure or dropped feedback due to collision with higher priority transmission. Alternatively or additionally, the BS may fail to receive the HARQ feedback 230 for any reason. The WTRU may receive a request 235 for one-shot HARQ feedback with an indication of a priority level (e.g. priority 1) from the BS. The request 235 for the one-shot HARQ feedback may be included, for example, in scheduling DCI or non-scheduling DCI with the indication of the priority level. Specifically, a flag indicating the one-shot HARQ feedback and another flag indicating the priority level may be transmitted to the WTRU in the scheduling DCI or the non-scheduling DCI.

Upon receiving the request 235 for one-shot HARQ feedback request with the indication of priority level (e.g., priority 1), the WTRU may generate a HARQ codebook based on the indicated priority. Although it is not illustrated in FIG. 2, assuming that the WTRU may receive up to a total of 16 TBs from a cell, it may determine a subset with priority 1 (e.g. TB3/PID3 and TB10/PID10). The HARQ codebook generated by the WTRU may include one or more ACK or NACK bits associated with the TB3/PID3 and TB10/PID10. The codebook size may be determined based on the number of HARQ processes associated with the indicated priority (i.e. the HARQ processes in the priority subset). In one example, the HARQ codebook may include ACK or NACK bits for the HARQ processes (in the priority subset) where the priority associated with the HARQ processes is equal to or greater than the indicated priority from the BS. In another example, when a semi-static codebook size is used or configured, in addition to the ACK or NACK bits for HARQ processes in the priority subset, the HARQ codebook may further include one or more NACK bits for the HARQ processes in a non-priority subset. In this case, the priority (or priorities) associated with the HARQ possesses in the non-priority subset is less than the indicated priority. Once the HARQ codebook is generated based on the indicated priority, the WTRU may transmit, to the BS, the selective one-shot HARQ feedback 240 that comprises the generated codebook.

Figure 3:
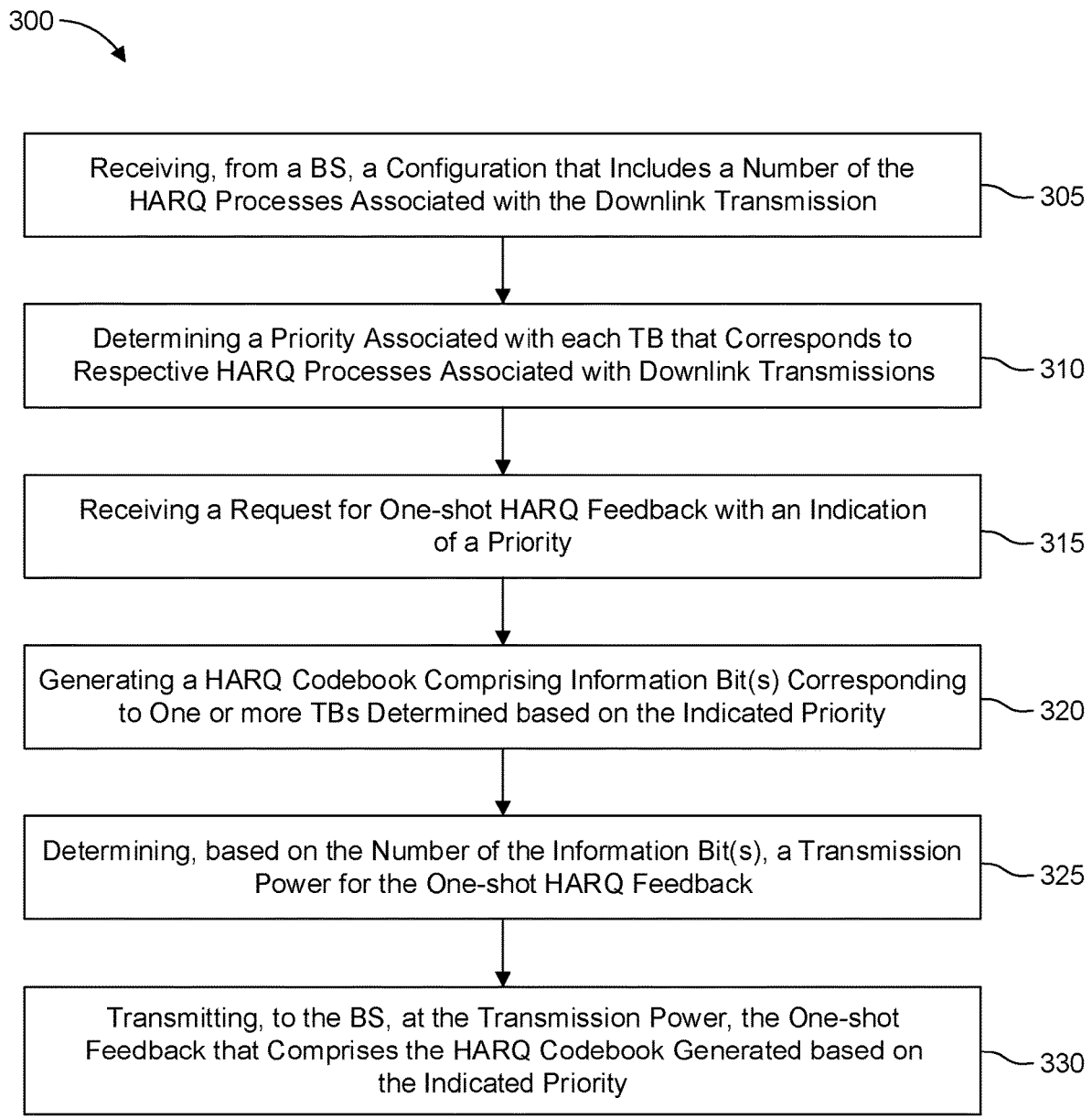
FIG. 3 is a diagram illustrating another example selective one-shot HARQ feedback procedure.

FIG. 3 illustrates another example selective one-shot HARQ feedback procedure 300, which may be used in combination with any of other embodiments described herein. At step 305, a WTRU may receive, via radio resource control (RRC) signaling or dynamic indication such as DCI or MAC-CE, a configuration that includes a number of HARQ processes associated with downlink transmissions from a BS. At step 310, the WTRU may determine a priority associated with each TB. Each TB may correspond to respective HARQ processes associated with the downlink transmissions. In case that the WTRU is configured with RRC signaling or received dynamic indication such as DCI or MAC-CE, the WTRU may determine the priority based on the RRC configuration, DCI or MAC-CE. In case that the WTRU is not configured with the RRC signaling or missed the dynamic indication such as DCI or MAC-CE, the WTRU may determine the priority based on the priority of previous PDSCH transmission, a downlink transmission type, associated scheduling CORSET or search space or the like. When the WTRU determines a priority of a TB based on the priority of previous PDSCH transmission, the WTRU may select the previous PDSCH transmission for the same HARQ process associated with the TB. For example, assuming that TB3 is associated with HARQ process 3 and TB10 is associated with HARQ process 10, if the WTRU determines the priorities of TB3 and TB10 based on the previous PDSCH transmissions, the WTRU determines the priorities of TB3 and TB10 using different previous PDSCH transmissions that are associated with HARQ process 3 and HARQ process 10, respectively.

Upon determining the priority associated with the HARQ processes or HARQ PIDs, at step 315, the WTRU may receive, from the BS, a request for one-shot HARQ feedback with an indication of a priority selected for the one-shot HARQ feedback. The WTRU may receive the request for one-shot HARQ feedback when the WTRU fails to transmit HARQ feedback due to LBT failure or the BS does not receive the HARQ feedback within certain time duration. At step 320, the WTRU may generate, based on the received, indicated priority, a HARQ codebook for the transmission of the one-shot feedback. The HARQ codebook generated may comprise one or more information bits corresponding to one or more TBs or HARQ processes determined based on the indicated priority. These TBs or HARQ processes determined based on the indicated priority may form a priority subset. For example, TBs or HARQ processes with certain priorities that are equal to or greater than the indicated priority may be included in the priority subset. The one or more information bits may comprise an acknowledgement (ACK) bit or a negative acknowledgement (NACK) bit. The HARQ codebook generated may comprise one or more ACK or NACK bits for the TBs or HARQ processes in the priority subset where each priority associated with the TBs or HARQ processes in the priority subset is greater than or equal to the indicated priority. If the HARQ codebook size is semi-statically determined or configured, the HARQ codebook may further include one or more NACK bits for the non-priority subset, wherein each priority associated with the TBs or HARQ processes in the non-priority subset is less than the indicated priority.

At step 325, the WTRU may determine a transmission power for the one-shot HARQ feedback. The transmission power may be determined, for example, based on the number of information bits in the generated codebook or based on the number of information bits of highest priority in the generated codebook or based on the number of information bits per priority subset in the generated codebook. At step 330, the WTRU may transmit, to the BS, at the determined transmission power, the one-shot HARQ feedback that comprises the HARQ codebook generated based on the indicated priority In one embodiment, the WTRU may transmit a one-shot HARQ-ACK feedback for a subset of HARQ processes associated with a priority level, and/or serving cells to improve reliability of the transmission. Such a subset may be referred to as a "priority subset" herein. This reporting may be referred to as a "selective one-shot HARQ feedback".

There may also be a benefit to bundle HARQ feedback for lower priority transmissions, given their relaxed latency timeline, while keeping unbundled (e.g., normal) HARQ feedback for prioritized transmissions. This may reduce the number of HARQ feedback collisions with other higher priority Uplink Control Information (UCI) or Physical Uplink Shared Channel (PUSCH) transmissions. In addition, this may reduce the number of dropped HARQ feedback, while leaving room for the network to request the WTRU for HARQ feedback for less latency stringent transmissions. This may also be a useful tool for the network to request feedback for dropped low priority HARQ-ACK transmissions (e.g., due to the conflict with higher priority transmissions) without the need to retransmit the associated TBs again, as the BS (e.g., gNB) is aware that some HARQ-ACK feedback is missing, due to intra-WTRU or inter-WTRU prioritization, for example.

In some situations, there may be an explicit indication for the HARQ feedback. A HARQ process may be included in or associated with a priority subset if it is indicated by L1, MAC, or RRC signaling. Alternatively or additionally, a HARQ process may be included in or associated with a priority subset indicated by a DCI triggering a one-shot HARQ feedback transmission. The indication to include/associate a given HARQ process in/with the priority set may comprise one or more of RRC signaling or dynamic signaling.

For example, the WTRU may be configured by RRC signaling with a subset of HARQ processes to be part of a one-shot HARQ feedback or to be possibly included in part of the priority subset if indicated dynamically. RRC may also configure a mapping between a HARQ process ID and a PDSCH group index, or for example, more generally a group of HARQ processes for which feedback may be reported together upon reception of an associated one-shot HARQ feedback request. RRC may configure the WTRU regarding whether selective one-shot feedback is applicable. RRC may configure the WTRU with one or more priority levels that may be applicable for one-shot HARQ feedback.

In an example of dynamic triggering of one-shot HARQ feedback, the WTRU may receive a Downlink Control Information (DCI) or Medium Access Control (MAC) Control Element (CE) indicating which HARQ process IDs are part of the priority subset. For example, the WTRU may receive a bitmap of HARQ process IDs where 1 or 0 indicate whether the HARQ process ID is included in part of the priority subset. The WTRU may then include HARQ feedback only for the indicated HARQ process to be part of the priority subset, such as upon triggering one-shot HARQ feedback. In another example, the WTRU may receive a DCI or MAC CE indicating a set of priority levels or PDSCH group indices. Upon reception of a one-shot HARQ feedback request with certain priority level(s), or PDSCH group(s), indicated, the WTRU may include the HARQ processes associated with those priority level(s), or PDSCH group(s), as part of the "priority subset" for which it provides HARQ feedback together, for example upon triggering one-shot HARQ feedback.

Dynamic signaling may indicate a PDSCH group index or a group of HARQ processes configured by RRC. Upon reception of such group index, the WTRU may consider the HARQ process IDs mapped to the group index as part of the priority subset. The WTRU may associate a HARQ process to a group index per a mapping configured by RRC or by maintaining the group index assigned to each scheduled PDSCH. In one example, dynamic signaling may indicate a state index associated with one or more DL Semi-Persistent Scheduling (SPS) or configured grant resources (e.g., states used for SPS (de)-activation). Upon reception of such a state index, the WTRU may consider the HARQ process IDs (PIDs) associated with the state as part of the priority subset.

Dynamic signaling may override a previously configured priority subset by RRC. For example, the WTRU may be configured by RRC with a default priority subset, which the WTRU uses by default upon triggering or reception of a one-shot HARQ feedback request. The WTRU may override or temporarily suspend the default subset if the dynamic signaling indicates a different priority subset.

In some embodiments, there may be a dynamic determination of one-shot HARQ feedback by the reception of subsequent scheduling for the same HARQ PID, or the same HARQ PID group. In one example, the WTRU may trigger one-shot HARQ feedback and provide HARQ feedback for all HARQ process IDs mapped to the same PDSCH group index configured by RRC upon reception of a retransmission for a HARQ PID that belongs to the same PDSCH group index. In one example, the WTRU may trigger one-shot feedback upon reception for all HARQ process IDs for which new data indicator (NDI) has not been toggled (e.g., for which a TB is pending in the HARQ buffer) upon reception of a retransmission for a DL TB associated with the same PDSCH group index.

In some embodiments, there may be HARQ processes associated with certain serving cell(s). In one example, the WTRU may receive a one-shot HARQ feedback request for a group for HARQ processes associated with a subset of serving cell(s). The WTRU may receive a cross carrier request for HARQ feedback. For example, the WTRU may receive a one-shot HARQ feedback request with a carrier index or a control format indicator (CFI) field indicated for a different carrier than the one on which the request was received. Upon reception of such a request, the WTRU may include HARQ PIDs associated with the requested cells (e.g., part of the priority subset).

In another example, the WTRU may exclude HARQ PIDs associated with serving cells different than the one on which the one-shot HARQ feedback request was received from the priority subset. For example, the WTRU may be configured, or may determine, a mapping between each serving cell and a subset of HARQ processes; the WTRU may then exclude HARQ processes mapped to serving cells other than the one on which the one-shot HAQR feedback request was received on.

In another example, the WTRU may determine the cell's priority based on associated services, data radio bearers (DRBs), or logical channels. For example, the WTRU may receive a one-shot HARQ feedback request for a certain priority level, and the WTRU may then include HARQ PIDs of the same cell associated with that priority level. In one example, the WTRU may determine the priority of a cell according to the configured LCH to cell restrictions, and/or the LCH to priority level mapping configured by RRC.

In some embodiments, there may be HARQ processes or HARQ PIDs associated with certain HARQ-ACK priority level(s). The WTRU may keep track of which HARQ processes (or HARQ PIDs) are associated with a certain priority level or codebook. A HARQ process may be included in a priority subset depending on at least one aspect of a transmission using, or associated to, this HARQ process.

In one example, an aspect of the transmission may be a priority level associated to HARQ-ACK. For example, upon reception of a one-shot HARQ feedback request for a certain priority subset, the WTRU may provide one-shot HARQ feedback for the one or more HARQ processes associated with that priority level. The WTRU may keep track of the priority level associated with a scheduled PDSCH to determine which HARQ processes match the indicated priority level.

In one example, an aspect of the transmission may be a PDSCH group or codebook index. For example, upon reception of a one-shot HARQ feedback request along with, or within the same slot as, a PDSCH group-based dynamic feedback request for a certain PDSCH group, the WTRU may exclude one or more HARQ processes or HARQ PIDs not associated with the indicated PDSCH group index from the priority subset. In a different example, the WTRU may exclude one or more HARQ processes or HARQ PIDs from the priority subset if the one-shot HARQ feedback for those HARQ processes has been provided in the same slot in response to a PDSCH group-based dynamic feedback request. In another example, the WTRU may exclude one or more HARQ processes or HARQ PIDs from the priority subset if the HARQ process' new field indicator (NFI) value for their corresponding indicated PDSCH group has been toggled. In a different example, the WTRU may exclude one or more HARQ processes or HARQ PIDs not associated with a HARQ feedback codebook index, or type, associated with the one-shot HARQ feedback request, where the codebook type may be determined from dynamic signaling, the priority level, and/or whether the associated PUCCH resource occupies a whole slot or a subslot.

In one example, an aspect of the transmission may be a PDSCH-to-HARQ-ACK (K1) value, such as whether the K1 is numeric or not.

In one example, an aspect of the transmission may be a control resource set (CORESET) used for the DCI indicating the transmission. For example, a WTRU may associate a HARQ process or HARQ PID with a certain priority level, or include it in the priority subset, if a property of the PDCCH resource (e.g., CORESET, RNTI, search space) that scheduled the associated PDSCH is associated with a given priority level or a priority subset and/or meets a reliability applicability criteria configured by RRC. In another example, the WTRU may be configured with multiple transmission and reception points (TRPs) within a serving cell, whereby each TRP may be associated with a PDCCH, a subset of PDCCH resources, or a subset of coresets. The WTRU may receive a one-shot HARQ feedback request from one TRP. The WTRU may include HARQ processes (or HARQ PID) associated with the TRP from which the WTRU received the one-shot HARQ feedback request part of the priority subset. In a different example, the WTRU may include HARQ processes (or HARQ PID) associated with a TRP different from the one which the WTRU received the one-shot HARQ feedback request part of the priority subset, such as upon receiving an indication.

In one example, an aspect of the transmission may be whether the HARQ process has been successfully decoded and HARQ feedback has been provided already. For example, the WTRU may exclude HARQ PID(s) from the priority subset if the WTRU has already provided the HARQ feedback for the associated TB and the TB was successfully decoded. In a different example, the WTRU may include a HARQ process in the priority subset only if the associated TB has not been decoded successfully.

In one example, an aspect of the transmission may be an NDI, where the WTRU may include HARQ processes (or HARQ PIDs) in the priority subset if the NDI for this HARQ process has not been toggled and there is a pending TB in the associated HARQ buffer.

In one example, an aspect of the transmission may be a PDSCH resource type. For example, the WTRU may include HARQ PIDs for semi-persistent scheduling (SPS) or dynamic assignments may be excluded from the priority subset. In a different example, the WTRU may include a HARQ process in the priority subset if the associated PDSCH resource meets a certain reliability criterion.

In one example, an aspect of the transmission may be a cell or bandwidth part (BWP). For example, the WTRU may exclude one or more of certain HARQ processes (or HARQ PIDs) from the priority subset if their corresponding PDSCH was scheduled on different BWP and/or cell than the one on which the one-shot HARQ feedback request was received. In another example, the one-shot HARQ feedback request may indicate a certain cell or BWP; the WTRU may include only HARQ process IDs associated with the indicated cell and/or BWP in the priority subset.

In one example, an aspect of the transmission may be that the WTRU includes one or more HARQ processes (or HARQ PIDs) associated with the same processing timeline, a certain pipeline, and/or a certain processing chain in the priority subset to match a processing pipeline, processing capability, and/or scheduling timeline indicated by or determined from the DCI.

In one example, an aspect of the transmission may be whether HARQ feedback is disabled. In some systems, HARQ feedback may be disabled by the network for some HARQ process(es) or HARQ PIDs, such as by RRC or dynamic signaling. The WTRU may assume that HARQ PIDs for which HARQ feedback is disabled are excluded from the priority set. In a different example, the WTRU may include only HARQ process(es) or HARQ PID(s) for which HARQ feedback has been disabled in the priority set upon reception of a one-shot HARQ feedback request.

As described above, the downlink transmissions considered for HARQ feedback may include, but are not limited to, at least one of a: last PDSCH transmission before triggering of the one-shot HARQ feedback; PDSCH(s) in the last downlink portion of the radio frame configuration in TDD; PDSCH(s) in the last scheduled channel occupancy time (COT); PDSCH(s) scheduled within a time window prior to the evaluation of the priority subset (e.g., the subset of HARQ processes for which the WTRU feeds back HARQ-ACK); PDSCH(s) scheduled within a time window prior to the reception of the DCI requesting one-shot HARQ feedback, and/or more generally triggering one-shot HARQ feedback; downlink TBs for which the time since the initial transmission has not exceeded a certain time threshold, which may be predefined or configured semi-statically by RRC; PDSCH(s) for which the WTRU has sufficient time to process the TB and determine a HARQ-ACK value; and/or, any previously scheduled PDSCH with a TB stored in a HARQ process buffer.

When determining what process to include in the HARQ feedback for a given priority level, the time may be either based on the time of reception of DCI for one-shot HARQ feedback, or the earliest possible time for the transmission of feedback (e.g., or in some case where no LBT is used, or if WTRU processing makes it possible). Further, it may be considered either from the time of initial HARQ transmission and or last transmission (e.g., either the DCI reception, or actual transmission) for the given process.

In some embodiments, there may be HARQ feedback of DL semi-persistent (SPS) transmissions. In one example, a WTRU may be configured to send the HARQ-ACK feedback of a semi-persistent (SPS) downlink transmission and/or the acknowledgement of a SPS release using the selective one-shot HARQ feedback. For example, a WTRU may be configured with multiple selective one-shot HARQ feedbacks, each one with a given priority. The WTRU may then determine the priority of the DL SPS using the configuration parameters of the DL SPS. In one example, the semi-static configuration of the DL SPS may include a priority parameter that can be mapped to a selective one-shot HARQ feedback or the configuration may directly map the configuration to a selective one-shot HARQ feedback. In another example, a WTRU may dynamically determine the selective one-shot HARQ feedback based on, for example, the HARQ PID used for the DL transmission. For example, a WTRU may be configured with a DL SPS resource for which the HARQ PID associated with a PDSCH transmission is calculated using a formula that depends on the transmission time. A WTRU may also be configured with a selective one-shot HARQ feedback that is based on a HARQ PID, such as a selective one-shot HARQ feedback that is for a subset of HARQ PIDs. Upon determining the HARQ process (or HARQ PID) for a given PDSCH transmission, a WTRU may acknowledge the HARQ process using the corresponding selective one-shot feedback.

In another example, a WTRU may determine the selective one-shot HARQ feedback to associate/transmit the acknowledgement of SPS release using the DCI indicating the SPS release. Such a DCI may reuse some of the existing bitfield to indicate the associated selective one-shot HARQ feedback. In one example, a time domain resource allocation field (TDRA) may be reused to indicate the associated selective one-shot HARQ feedback. For example, a WTRU may be configured with a mapping between the TDRA codepoints in the DCI and the selective one-shot feedbacks. Such a mapping may be configured semi-statically using RRC configuration or alternatively fixed in the specification.

In one example, upon receiving the DCI releasing SPS configuration, a WTRU may be triggered to transmit the selective one-shot HARQ feedback associated with the ACK/NACK of the SPS release. A WTRU may use the indicated PUCCH resource indication and the HARQ-ACK feedback timing in the DCI. The WTRU may then transmit all the ACK/NACK bits of a previously transmitted PDSCH associated with the indicated selective one-shot HARQ feedback. A WTRU may be configured to piggyback the selective one-shot HARQ feedback on the PUSCH if the indicated PUCCH resource overlaps with a PUSCH. A WTRU may be configured to piggyback the selective one-shot HARQ only if the PUSCH grant(s) satisfy one or more of the following: the priority associated with PUSCH grant is equal or greater than the priority associated with the selective one-shot feedback; and/or, the time difference between the end symbol of the indicated PUCCH and the end symbol of PUSCH is below a configured threshold.

In some embodiments, there may be a maximum number of processes for selective one-shot HARQ feedback. Specifically, there may be a maximum number of HARQ processes (or HARQ PIDs) that may be included in a priority subset.

The WTRU may construct a dynamic or a semi-static HARQ feedback codebook for a one-shot HARQ feedback request with a priority subset. For a dynamic codebook, the WTRU may determine the maximum number of HARQ processes (or HARQ PIDs) to be included in the priority set from the total downlink assignment index (DAI) value. For example, if the total DAI is signaled in part of the one-shot HARQ feedback request for a given priority set, the WTRU may determine the number of HARQ process in the evaluation period from the prior scheduled {cDAI, tDAI} values per PDSCH.

The WTRU may determine the maximum number of HARQ processes (or HARQ PIDs) that may be included in a priority subset semi-statically, such as from the number of HARQ processes configured for each serving cell. In one example, the WTRU may be configured with 3 serving cells, and 16 HARQ processes for each cell. Assuming that one of the cells is not applicable to priority level x, or codebook index x, the WTRU may assume that the maximum number of HARQ processes is 32 for a codebook constructed for one-shot HARQ feedback for priority level x. Assuming that all cells support any priority level, the WTRU may assume that the maximum number of HARQ processes is 48. In another example, the WTRU may be configured by RRC such that only 8 out of 16 HARQ processes in the cell may be included in the priority set; with such a configuration, the WTRU may assume that the max number of HARQ process per cell is 8 for a codebook constructed for one-shot HARQ feedback. The WTRU may further deduct the number of HARQ processes for which feedback is disabled from the determined max number of HARQ processes (or HARQ PIDs) that may be included in the priority subset.

In one example, the WTRU may be configured by RRC with a maximum number of HARQ processes that may be included in a priority subset; though the WTRU might, in some cases, have determined a larger number of HARQ processes that meet the priority subset inclusion criteria. With such configuration, the WTRU may rank the HARQ processes in the priority subset by order of priority, time since the initial transmission, time since K1, max LCH priority, and/or HARQ PID index.

In some embodiments, selective one-shot HARQ feedback and set power may be encoded. A WTRU may be scheduled with DL transmissions of different priorities. The WTRU may use the priority of the DL transmission to determine the associated priority level of the feedback. The WTRU may be configured to report feedback for all TBs (e.g., HARQ processes and/or serving cells) of a specific priority (e.g., all TBs that form a priority subset).

In some cases, groups of HARQ processes (or HARQ PIDs) and serving cells may be configured (e.g., semi-statically configured) to be used for transmissions of specific priority and may form a semi-static priority subset. The WTRU may be requested to provide feedback for all HARQ processes (or HARQ PIDs) and serving cells associated to one or more priority subsets. In another case, a HARQ process (or HARQ PIDs) and/or serving cell may be used for transmissions of any one of multiple priority levels. In such a case, the HARQ processes (or HARQ PIDs) and serving cells that make up a priority subset may be changed dynamically.

A WTRU may receive a one-shot HARQ feedback request associated with one or more priority level(s) (e.g., priority subset(s)) from the network. For the case where the priority subsets are semi-statically configured, the size of the codebook used for reporting HARQ feedback may be clear to both the WTRU reporting the feedback and the BS (e.g., gNB) detected/decoding the feedback. For the case where the priority subsets are dynamically determined by the WTRU based on scheduling information of each specific DL transmission, there may be a different interpretation of the codebook size, and position of specific HARQ-ACK values within the codebook, by the WTRU and BS (e.g., gNB) if the WTRU mis-detects one or more scheduling DCIs.

In some embodiments, there may be downlink assignment index (DAI) per priority subset, where a WTRU may be indicated a priority-subset specific DAI (e.g., counter or total DAI) in each scheduling instance. Based on the priority-subset specific DAI, the WTRU may be able to determine if one or more DCIs were mis-detected for that priority subset and more importantly how many and in which position within the HARQ feedback codebook. The one-shot feedback request may also indicate to the WTRU the expected size of the codebook (e.g., final total DAI).

In some embodiments there may be WTRU indication of reported HARQ processes (or HARQ PIDs), where a WTRU may provide an index for each HARQ-ACK feedback or for a set of HARQ-ACK feedback reports. For example, upon receiving a request for a one-shot HARQ feedback for transmissions of a priority subset, the WTRU may construct the codebook to feedback for all HARQ processes and serving cells for which it received scheduling of that priority level. The WTRU may include in a first set of bits an index indicating the HARQ process and serving cell applicable to the subsequent sets of bits providing the HARQ-ACK value. The WTRU may include feedback for all HARQ processes and serving cells for which the DL transmission was of equal or greater priority than that requested.

In another example, the index may be applicable to a set of subsequent HARQ-ACK bits. For example, an index may point to a group of HARQ processes and/or serving cells and the subsequent bits may provide the HARQ-ACK status of that group of HARQ processes and/or serving cells. In such an example, the WTRU may report feedback for all groups of HARQ processes and/or serving cells such that all HARQ processes and/or serving cells of the desired priority level are reported.

If some HARQ processes and/or serving cells were not actually used for DL transmissions, the WTRU may include NACK for such HARQ processes/serving cells. In this example, some HARQ processes and/or serving cells may not have actually been used for a DL transmission of the requested priority level but may have been used for transmissions of lower (or greater) priority level. In such a case, the WTRU may either report the HARQ-ACK for those processes or report NACK for those processes.

In some instances there may be feedback request indicating group of HARQ processes. The groups of HARQ processes for which a WTRU provides feedback in one-shot HARQ feedback may also be explicitly requested in the one-shot HARQ feedback request. For example, a WTRU may be configured with M groups of HARQ processes and serving cells. The WTRU may receive a one-shot HARQ feedback request explicitly requesting feedback for one or more of the M groups of HARQ processes (e.g., regardless of the priority level of each transmission within each fixed group).

Upon being requested to feedback HARQ-ACK for one or more of the pre-configured M groups of HARQ processes, the WTRU may construct a codebook of the appropriate size (e.g., the sum of all the elements of the requested groups). The WTRU may also append HARQ-ACK feedback for HARQ processes of a specific priority subset for whom the HARQ processes are not included in the request. For example, a WTRU may be requested to report feedback for a first group that covers all HARQ processes of a first serving cell. The WTRU may have also been scheduled with high priority DL transmissions on HARQ processes of a second cell. The WTRU may report all the feedback statuses of the HARQ processes of the requested group (e.g., of the first cell) and may append to the codebook the HARQ-ACK of the high priority HARQ processes transmitted on the second cell. The feedback transmitted by the WTRU may include a bit string indicating there are appended high priority HARQ-ACK feedbacks. The feedback transmitted by the WTRU may also include an index identifying each or the group of appended high-priority HARQ-ACK feedback.

In one case, the one-shot HARQ feedback request may provide a set of HARQ processes for which the WTRU may report HARQ-ACK feedback. Furthermore, the one-shot HARQ feedback request may include a priority level (or priority subset) for which the WTRU should provide required feedback (possibly by appending to the codebook). The WTRU may report feedback for all HARQ processes of the requested priority level and/or possibly of higher priority level.

Figure 4A:
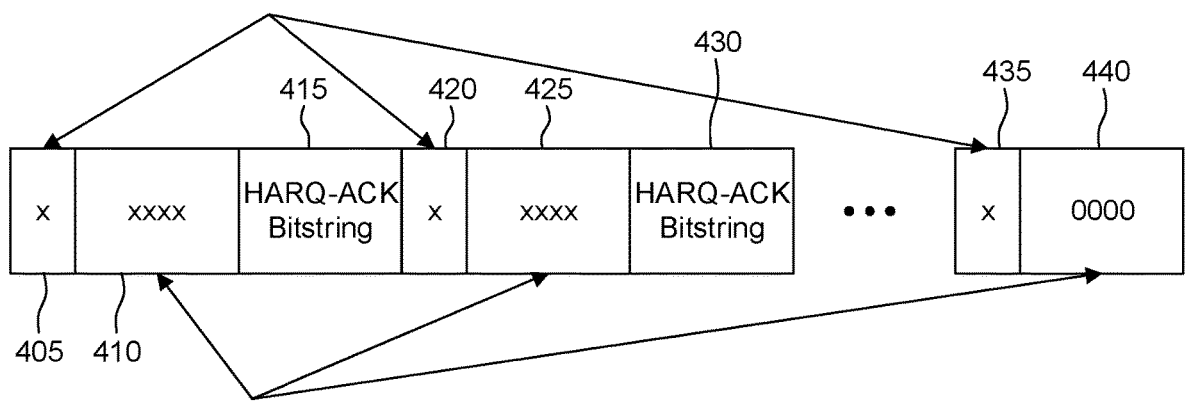
FIG. 4A is a diagram illustrating example HARQ feedback with indexing.

FIG. 4A illustrates example HARQ feedback 400 with indexing, which may be used in combination with any of other embodiments described herein. As illustrated in FIG. 4A, the example HARQ feedback 400 for multiple HARQ processes may comprise HARQ process index types 405, 420, 435, HARQ process index fields (HPIFs) 410, 425, 440, and HARQ-ACK bitstrings 415, 430. Each of the HARQ process index types 405, 420, 435 may comprise a bit indicating 0 or 1. The bit 0 in the HARQ process index types 405, 420, 435 may indicate that the HARQ Process ID associated with a subsequent HARQ-ACK bitstring may be determined from the preceding HARQ index value and/or an HPIF. The bit 1 in the HARQ process index types 405, 420, 435 may indicate that the HARQ Process ID associated with a subsequent HARQ-ACK bitstring is not explicitly indicated and (i.e. there is no HPIF included) and the HARQ Process ID associated with the subsequent HARQ-ACK bitstring may be determined as being the value that immediately succeeds a previous HARQ Process ID within the codebook. Each of the HPIFs 410, 425 may comprise the index values of the HARQ processes associated with the HARQ-ACK bitstrings 415, 430, respectively. A reserved HPIF value may be used to indicate the end of the codebook. For example, the HPIF 440 may include 0000 as the index value to indicate that it is the end of the codebook. The HPIFs 410, 425 may not be present if the preceding HARQ process index type is 1. In an example, if a WTRU needs to report HARQ-ACK feedback for the $3^{rd}$, $7^{th}$ and $10^{th}$ HARQ processes, the WTRU may include index values and HPIFs associated with the $3^{rd}$, $7^{th}$ and $10^{th}$ HARQ processes in the HARQ-ACK feedback. In this case, the preceding HARQ process index types for the HPIFs associated with the $3^{rd}$, $7^{th}$, and $10^{th}$ HARQ processes are 0.

FIG. 4B illustrates example compression 450 of one-shot HARQ feedback with indexing, which may be used in combination with any of other embodiments described herein. To reduce the feedback overhead, the WTRU may not report the index of every HARQ-ACK feedback it reports. As illustrated in FIG. 4B, an example codebook may comprise HARQ feedback 465, 475, 490 for $3^{rd}$, $4^{th}$ and $10^{th}$ HARQ processes. In this example, the WTRU may only report the index of the HARQ-ACK feedback it reports if it is not the direct, subsequent HARQ-ACK feedback to the previous HARQ-ACK feedback. For example, if the WTRU needs to report HARQ-ACK feedback for the $3^{rd}$, $4^{th}$, and $10^{th}$ HARQ processes, it may include an index 460 (i.e. 0011) for the $3^{rd}$ HARQ process, no index for the $4^{th}$ HARQ process (e.g., given that there are no other HARQ processes that could be fed back between the two HARQ processes) and an index 485 (i.e. 0110) for the $10^{th}$ HARQ process. As described above, the bit 1 in the HARQ process index type 470 may indicate that neither index value nor HPIF associated with the $4^{th}$ HARQ process are present in the codebook. Indices may also be absolute (e.g., indicating the absolute HARQ PID) or relative (e.g., indicating the HARQ PID relative to the HARQ PID of the immediately preceding HARQ-ACK value). For each HARQ-ACK feedback, the WTRU may report a first bit indicating the type of index (e.g., HARQ process index types 455, 470, 480, 495), next a bitstring indicating the index (e.g., HPIFs 460, 485, 497), and lastly the actual HARQ-ACK values (e.g., HARQ-ACK bitstings 465, 475, 490). For example, for the case where HARQ-ACK feedback of the $3^{rd}$, $4^{th}$, and $10^{th}$ HARQ processes are to be transmitted, the WTRU may construct the codebook as illustrated in FIG. 4B.

The bit indicating the type of index may also indicate whether an index is provided for the HARQ-ACK feedback. Furthermore, the index may be used to indicate that there are no further HARQ-ACK feedbacks in the codebook. The index may also provide the identity of a set of subsequent HARQ-ACK feedbacks such that an index, or an index type bit, is not required for each HARQ process.

In some embodiments, there may be CBG level feedback. A WTRU may be configured with different types of feedback for different priority levels. For example, the feedback for a high priority HARQ process may use TB level feedback and the feedback for a lower priority HARQ process may use CBG level feedback. In such a case, the WTRU may use repetition of the feedback for the HARQ processes using TB level feedback. This may ensure all feedback for all HARQ processes use the same amount of payload. For the case where repetition is used for high priority feedback, the reliability of such feedback may be improved.

In some embodiments, there may be power settings. The WTRU may use pre-determined and possibly configurable codebook sizes to report the one-shot HARQ feedback. The WTRU may have fewer bits to feedback than the pre-determined codebook size provides. Therefore, the WTRU may pad the codebook (e.g., with NACK values or bits) in locations mapping to HARQ processes for which the WTRU need not provide feedback. This may occur, for example, in the case where the WTRU provides an index that points to multiple HARQ processes but for which the WTRU does not have feedback for all of the HARQ processes pointed to by the index. When determining the power setting for the transmission of the feedback, the WTRU may consider the payload size to only be the number of bits used for actual feedback and to not consider the padded bits.

The power setting may be determined based on the number of HARQ-ACK bits for a specific priority subset. For example, the power setting may be determined as a function of the number of bits used to feedback HARQ-ACK for highest priority transmissions. In another example, the power setting may be determined as a function of the number of bits used to feedback HARQ-ACK for the highest priority transmissions as well as the over-all codebook size, or the total number of information bits. In another example, the power setting may be determined as a function of the number of bits used to feedback HARQ-ACK for a requested, or pre-determined or configurable, priority transmission and possibly any other transmissions of greater priority.

In another example, the power setting may be determined based on the number of HARQ processes in the requested priority subset, regardless of if there is actual feedback for all such HARQ processes.

In another example, the power setting may be determined by the last received DAI (e.g., total DAI). Such a value may be obtained from the most recent scheduled DL transmission or may be obtained from the one-shot HARQ feedback request.

The PUCCH resource configuration, including at least PUCCH resources, sub-slot configuration and PUCCH power control parameters, may be taken from the PUCCH configuration corresponding to the priority of associated to the HARQ-ACK included in the codebook. Alternatively or additionally, the WTRU may be configured with a separate PUCCH configuration for each configuration of selective one-shot HARQ feedback, such as per a priority level.

In some embodiments, there may be techniques for triggering of selective one-shot HARQ feedback. A WTRU may be configured with multiple selective one-shot HARQ feedbacks, each one may be associated to a given priority. In some cases, a WTRU may be configured to transmit a selective one-shot HARQ feedback when at least one or a combination events occur.

One such event for transmitting a selective one-shot HARQ feedback may be after reception of DCI. For example, a WTRU may be configured to transmit a selective one-shot HARQ feedback after receiving a DCI scheduling one of the HARQ processes associated with high priority transmission. Such a DCI may carry an explicit indication to trigger the feedback or alternatively, only the reception of such a DCI may trigger the selective one-shot HARQ feedback. In another example, a WTRU may receive a DCI which does not schedule a PDSCH (e.g., non-scheduling DCI). For example, a DCI triggering aperiodic CSI report may also be used to trigger the one-shot feedback.

One such event for transmitting a selective one-shot HARQ feedback may be after failure to receive a HARQ retransmission(s). For example, the WTRU receives a first transmission of a HARQ PID that is within the priority subset (e.g., subset of DL HARQ processes). The WTRU may then fail to decode correctly the transmission and report a NACK to the BS (e.g., gNB). The WTRU may autonomously transmit one-shot HARQ feedback after a timer expiry. Such a timer may be configured semi-statically to the WTRU or fixed in the specification. The timer duration may depend on the priority of the downlink transmission. In another example, the WTRU may transmit the one-shot HARQ feedback if the channel occupancy time (COT) ends without receiving a HARQ retransmission. The COT may be initiated by the BS (e.g., gNB) or the WTRU and shared with the BS (e.g., gNB). In another example, the WTRU may trigger autonomous one-shot HARQ feedback after failing a certain number of retransmissions for the same TB, whereby the number of failed transmissions threshold is either pre-determined or semi-statically configured.

One such event for transmitting a selective one-shot HARQ feedback may be after failure of accessing channel. For example, the WTRU fails to transmit a HARQ-ACK feedback (e.g., one-shot HARQ feedback or a HARQ codebook) due to listen before talk (LBT) failure. The WTRU then autonomously transmits the selective one-shot HARQ feedback in a next available opportunity to access the channel.

One such event for transmitting a selective one-shot HARQ feedback may be after having a HARQ-ACK is NACK for a HARQ P ID that is within the priority subset (subset of DL HARQ processes), the WTRU autonomously transmits one-shot HARQ feedback. For example, a WTRU may be configured with multiple selective one-shot HARQ feedbacks corresponding to a set of HARQ processes subsets. If only one NACK of the HARQ processes subset is determined, a WTRU may transmit the prioritized one-shot HARQ feedback. In another example, the WTRU may trigger autonomous one-shot HARQ feedback if the number of NACKs in the applicable priority subset is larger than a certain threshold.

One such event for transmitting a selective one-shot HARQ feedback may be after pre-emption and/or failure of transmitting HARQ-ACK feedback. A WTRU may drop the HARQ-ACK transmission and transmit the selective one-shot HARQ feedback. For example, a WTRU may be configured with HARQ-ACK transmission resource overlapping with higher priority uplink transmission. In another example, a WTRU HARQ-ACK transmission resource may overlap with higher priority downlink transmission.

One such event for transmitting a selective one-shot HARQ feedback may be after a decision related to dropping a scheduled HARQ-ACK due to inter-WTRU or intra-WTRU prioritization. For example, the WTRU may trigger autonomous selective one-shot HARQ feedback after dropping a scheduled HARQ-ACK and/or after deprioritizing HARQ-ACK transmission(s) for one or more HARQ process in the priority subset.

One such event for transmitting a selective one-shot HARQ feedback may be after failure to receive a DL signal/channel. For example, a WTRU may be configured to monitor a COT structure indication from the BS (e.g., gNB) in a set of monitoring slots. After failing to receive the COT indication for a consecutive N occasions, a WTRU may autonomously transmit the selective one-shot HARQ feedback. This approach may be useful if NACK-to-ACK error occurs and there is no DL traffic to be scheduled for a WTRU.

One such event for transmitting a selective one-shot HARQ feedback may be after a timer expiry. A WTRU may be configured with a timer that is updated based on the scheduling of a subset of HARQ PIDs. For example, after receiving a downlink scheduling with a HARQ PID from a subset of HARQ PIDs, the timer is reset. In another example, the WTRU may reset the timer each time after it receives a DCI scheduling. The value of the timer may be configured semi-statically by RRC. The WTRU may start the timer with a value that depends on the priority level and/or the PDSCH group index indicated for the PDSCH.

In some embodiments, there may be techniques for resource selection for selective one-shot HARQ feedback. A WTRU may determine the resource on which to transmit the feedback as a function of the contents of the feedback and the priority of the feedback. For example, the WTRU may have a set of feedback resources and some feedback resources may be associated with a specific priority level. The WTRU may only use such feedback resources if the feedback includes feedback only for, or at least for, transmissions of the associated priority level.

A WTRU may be configured with different feedback resource types. For example, a WTRU may be configured with PUCCH resources, cell group (CG) resources, scheduling request (SR) resources, random access resources (e.g., for 2-step or 4-step RA). The WTRU may determine the type of resource that it may use for UCI feedback (e.g., HARQ-ACK feedback) based on the priority level of the feedback being transmitted. For example, for feedback for the highest priority subset, the WTRU may use any feedback resource type and may thus select the first available feedback resource. In another example, for feedback of a different priority subset, the WTRU may only select PUCCH or CG resource types, and may determine the appropriate feedback resource occasion based on the timing of the last DL transmission for which the feedback report is reporting feedback.

A WTRU may use a dynamically scheduled PUSCH resource to transmit UCI (e.g., HARQ-ACK feedback). The selection of such a PUSCH resource may be determined based on whether the WTRU was scheduled to feedback UCI in the same slot. In another example, the selection of such a PUSCH resource may be determined based on the priority of the HARQ-ACK feedback and based on the timing of the PUSCH resource. For example, a WTRU may have a HARQ-ACK codebook composed of high priority feedback. The WTRU may be scheduled with PUSCH occurring prior to the timing of the next upcoming available feedback resource. The WTRU may autonomously transmit the UCI on the scheduled PUSCH. Such a decision to autonomously multiplex the UCI to the PUSCH may depend on the priority level of the UCI. It may also depend on the timing of the PUSCH transmission. For example, this may be possible (e.g., only possible) for the first PUSCH of a channel occupancy time (COT).

The WTRU may provide an indication to the BS (e.g., gNB) that UCI is included with the PUSCH. In another example, the DCI scheduling the PUSCH may also trigger a HARQ-ACK feedback report, possibly including the expected priority subset(s).

The WTRU may determine the appropriate power setting parameters (e.g., beta offset) of the UCI as a function of the priority of the UCI and the priority of the PUSCH transmission.

The WTRU may determine to autonomously transmit UCI based on if there is any pending high priority UCI for transmissions scheduled with non-numeric K1 value. For example, the WTRU may always include UCI of high priority data in a first available PUSCH resource when the associated DL transmission was scheduled with non-numeric K1. In such an example, the WTRU may accumulate the HARQ-ACK feedback of all high priority transmissions scheduled with non-numeric K1 and may transmit UCI for the set at the first available feedback resource or PUSCH resource.

In some embodiments, there may be overlapping selective one-shot HARQ feedback(s). In one instance, a WTRU may be configured to prioritize among the selective one-shot HARQ feedback(s) and/or among a selective one-shot HARQ feedback and other HARQ-ACK codebooks (e.g., a dynamic HARQ-ACK codebook or a semi-static HARQ-ACK codebook) in case of overlapping uplink resources. In one case, a WTRU may be configured to prioritize only one HARQ feedback using the associated priority with the HARQ feedback. The priority associated with a selective one-shot HARQ feedback may be determine based on the one or approaches disclosed herein, such as those proposed in above. In another case, a WTRU may be configured to prioritize the last triggered one-shot HARQ feedback. For example, a WTRU may receive a request to transmit a first selective one-shot HARQ feedback in slot n and subsequently another request for a second selective one-shot HARQ feedback. The WTRU may prioritize the second triggered selective one-shot HARQ feedback.

In another example, a WTRU may be configured to multiplex multiple selective one-shot HARQ codebooks in one HARQ codebook. A WTRU may rank, in increasing order, the scheduled selective one-shot HARQ feedbacks and determine the number of HARQ feedback(s) to multiplex based on one or more of the following: the last indicated PUCCH resource (e.g., a WTRU may determine how many HARQ codebooks to multiplex based on the payload of the last indicated PUCCH resource); and/or, the resource available for HARQ-ACK UCI within a PUSCH in case of UCI multiplexing on PUSCH (e.g., beta factor indicated for HARQ transmission within PUSCH).

In one embodiment, there may be PDSCH grouping with multiple HARQ-ACK priorities. In some cases, a WTRU may be configured with per priority dynamic HARQ-ACK codebook (e.g., where for each priority the size of the HARQ-ACK codebook may vary dynamically). One example of per priority dynamic HARQ-ACK codebook may be based on the PDSCH grouping specified in NR unlicensed. Another example may be based on the dynamic HARQ-ACK codebook specified in NR. As described herein, there may be approaches that support per-priority dynamic HARQ-ACK codebook using existing PDSCH grouping embodiment(s).

In some embodiments, there may be a mapping between PDSCH group(s) and a type of service/priority. In one instance, a WTRU may be configured to associate semi-statically one or more PDSCH group(s) to a type of service/priority. For example, a WTRU may receive a mapping between PDSCH group indices (e.g., the g parameter used in NR-U) to a type of service/priority using RRC signaling. In other instances, the association between PDSCH group(s) and type of service/priority may be indicated dynamically using the dynamic indication of the type of service/priority. For example, a WTRU may be configured to support multiple (e.g., two) types of service/priorities and multiple (e.g., two) PDSCH groups. After determining the type of service of the scheduled PDSCH, a WTRU may use the PDSCH group indication used in the PDSCH scheduling and associate the type of service to a PDSCH group index. Such a case may enable reducing the overhead in the DCI format scheduling URLLC type of service. For example, if a compact DCI is used, the WTRU may not receive an indication to which PDSCH group the scheduled PDSCH is associated with. The WTRU may use the service/priority indication and then associate the feedback with the configured PDSCH group of URLLC.

With dynamic mapping between a PDSCH group and type of service/priority, the WTRU may be configured to reset/flush the HARQ-ACK bits of a PDSCH group if the WTRU receives a downlink assignment with the same PDSCH group index but with different priority/type of service. For example, in a first COT, a WTRU may be scheduled with PDSCHs of priority 1 (e.g., eMBB type of traffic) associated with PDSCH group 1. In a subsequent COT, the WTRU may be scheduled with a PDSCH of priority 2 (e.g., URLLC type of traffic) associated with PDSCH group 1. The WTRU may then flush the HARQ-ACK codebook 1, for example, associated with PDSCH group 1 and use it for traffic with priority 2. This solution may be useful if the DCI format scheduling high priority service does not have a new feedback indicator (NFI). For example, a compact DCI may be used to schedule a URLLC type of service. Such a DCI may not support an NFI bitfield in order to keep the DCI size small. A WTRU may be configured to receive NFI in only a subset of DCI formats. Upon receiving a DCI with the same PDSCH group index and NFI bitfield, the WTRU may follow the NFI indication from the network. In other cases, a WTRU may be configured to autonomously toggle NDI/reset/flush the HARQ-ACK codebook of a PDSCH group associated to a given priority/type of service (e.g., URLLC) after a timer is expired and no PDSCH scheduling is received for that PDSCH group. The timer value may be RRC configured or fixed in the specification.

In some embodiments, there may be triggers to transmit a HARQ-ACK codebook for a PDSCH group. A WTRU may be configured to autonomously transmit the per priority dynamic HARQ-ACK codebook based on the triggering event described for the one-shot HARQ feedback. In addition, a WTRU may be configured to autonomously transmit a HARQ-ACK codebook for a PDSCH group if a WTRU determines that the type of service/priority associated to a PDSCH group is changed. For example, a WTRU is scheduled with PDSCH belonging to PDSCH group 1 and it is associated to priority 2 (e.g., eMBB type of service). In subsequent transmissions, a WTRU receives a PDSCH belonging to PDSCH group 1 and it is associated to priority 1 (e.g., URLLC type of service). A WTRU may then transmits the HARQ-ACK codebook associated to PDSCH group 1 previously constructed and reset/flash the HARQ-ACK codebook.

In some embodiments, there may be a joint transmission of multiple (e.g., two) HARQ-ACK codebooks for different PDSCH groups. In some instances, a WTRU may determine whether to transmit jointly two HARQ-ACK codebooks for two different PDSCH groups based on the PUCCH resource indication (PRI). For example, in case a WTRU is scheduled using a compact DCI, the bitfield indicating joint transmission of the HARQ codebooks may not be present. In one example, a WTRU may be configured to transmit two HARQ-ACK codebooks based on the payload of the indicated PRI. In another example, a WTRU may be configured semi-statically with a subset of PUCCH resources for joint HARQ-ACK codebook. If the PRI indicates one resource from the subset, the WTRU may transmits two HARQ-ACK codebooks. In another instance, a WTRU may determine whether to transmit jointly two HARQ-ACK codebooks if the PUSCH is used to transmit the HARQ feedback (e.g., piggybacking UCI on PUSCH). In one example, a WTRU may determine first if the UCI is to be piggybacked on the PUSCH and then using the parameters for piggybacking indicated by the BS (e.g., gNB) to determine whether to jointly transmit two HARQ-ACK codebooks. For example, if a WTRU is indicated with a beta factor greater than a threshold, a WTRU may then transmit two HARQ-ACK codebooks.

In some instances, a WTRU may determine whether to transmit jointly two HARQ-ACK codebooks based on the HARQ-ACK feedback timing indication of the scheduled PDSCH group and/or the HARQ-ACK transmission time of a previous PDSCH group. For example, a WTRU may receive first DL assignments associated with PDSCH group 1 and a first HARQ-ACK codebook transmission occasion in t1. In subsequent DL transmissions, DL PDSCHs are associated with PDSCH group 2 and a HARQ-ACK feedback timing t2. In one example, a WTRU may determine whether to jointly transmit two HARQ-ACK codebooks based on the time difference between t1 and t2 (e.g., t2−t1). For example, if t2−t1 is above a configured threshold, a WTRU may transmit jointly the two HARQ-ACK codebooks. In another example, a WTRU may transmit two HARQ-ACK codebooks if t2−t1 is below a configured threshold.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor configured to:
receive configuration information for providing hybrid automatic repeat request (HARQ) feedback, wherein the configuration information indicates one or more HARQ feedback groups, and wherein each HARQ feedback group is associated with one or more serving cells and one or more HARQ processes;
receive downlink control information (DCI) indicating that the WTRU is to transmit one or more HARQ feedback bits corresponding to a first HARQ feedback group of the one or more HARQ feedback groups; and
transmit a one-shot HARQ feedback transmission, wherein the one-shot HARQ feedback transmission comprises the one or more HARQ feedback bits corresponding to the first HARQ feedback group of the one or more HARQ feedback groups, wherein the first HARQ feedback group is associated with at least a first serving cell and at least a first HARQ process.

2. The WTRU of claim 1, wherein the configuration information is received in a radio resource control (RRC) message.

3. The WTRU of claim 1, wherein the configuration information further indicates a respective index for each of the one or more HARQ feedback groups, and wherein the DCI comprises an indication of an index associated with the first group.

4. The WTRU of claim 1, wherein the DCI comprises an indication that the WTRU is to transmit the one-shot HARQ feedback transmission.

5. The WTRU of claim 1, wherein the processor is further configured to construct a dynamic or semi-static HARQ feedback codebook associated with the one-shot HARQ feedback.

6. The WTRU of claim 1, wherein the processor is further configured to determine a number of serving cells and a number of HARQ processes associated with each serving cell.

7. The WTRU of claim 1, wherein the processor is further configured to determine that the DCI is a non-scheduling DCI.

8. A method implemented in a wireless transmit/receive unit (WTRU), the method comprising:
receiving configuration information for providing hybrid automatic repeat request (HARQ) feedback, wherein the configuration information indicates one or more HARQ feedback groups, and wherein each HARQ feedback group is associated with one or more serving cells and one or more HARQ processes;
receiving downlink control information (DCI) indicating that the WTRU is to transmit one or more HARQ feedback bits corresponding to a first HARQ feedback group of the one or more HARQ feedback groups; and
transmitting a one-shot HARQ feedback transmission, wherein the one-shot HARQ feedback transmission comprises the one or more HARQ feedback bits corresponding to the first HARQ feedback group of the one or more HARQ feedback groups, wherein the first HARQ feedback group is associated with at least a first serving cell and at least a first HARQ process.

9. The method of claim 8, wherein the configuration information is received in a radio resource control (RRC) message.

10. The method of claim 8, wherein the configuration information further indicates a respective index for each of the one or more HARQ feedback groups, and wherein the DCI comprises an indication of an index associated with the first group.

11. The method of claim 8, wherein the DCI comprises an indication that the WTRU is to transmit the one-shot HARQ feedback transmission.

12. The method of claim 8, further comprising constructing a dynamic or semi-static HARQ feedback codebook associated with the one-shot HARQ feedback transmission.

13. The method of claim 8, further comprising determining a number of serving cells and a number of HARQ processes associated with each serving cell.

14. The method of claim 8, further comprising determining that the DCI is a non-scheduling DCI.

15. A base station comprising:
a processor configured to:
transmit configuration information for providing hybrid automatic repeat request (HARQ) feedback, wherein the configuration information indicates one or more HARQ feedback groups, and wherein each HARQ feedback group is associated with one or more serving cells and one or more HARQ processes;
transmit downlink control information (DCI) indicating a first HARQ feedback group of the one or more HARQ feedback groups; and receive a one-shot HARQ feedback transmission, wherein the one-shot HARQ feedback transmission comprises one or more HARQ feedback bits corresponding to the first HARQ feedback group of the one or more HARQ feedback groups, wherein the first HARQ feedback group is associated with at least a first serving cell and at least a first HARQ process.

16. The base station of claim 15, wherein the configuration information is transmitted in a radio resource control (RRC) message.

17. The base station of claim 15, wherein the DCI is a non-scheduling DCI.

* * * * *

UNITED STATES PATENT AND TRADEMARK OFFICE
CERTIFICATE OF CORRECTION

| | | |
|---|---|---|
| PATENT NO. | : 12,308,966 B2 | Page 1 of 1 |
| APPLICATION NO. | : 17/798385 | |
| DATED | : May 20, 2025 | |
| INVENTOR(S) | : Faris Alfarhan et al. | |

It is certified that error appears in the above-identified patent and that said Letters Patent is hereby corrected as shown below:

In the Specification

Column 1, Lines 41, delete "transmport block" and insert -- transport block --.

Signed and Sealed this
Twenty-fourth Day of June, 2025

Coke Morgan Stewart
*Acting Director of the United States Patent and Trademark Office*